United States Patent [19]

Gerloff et al.

[11] Patent Number: 4,694,873
[45] Date of Patent: Sep. 22, 1987

[54] VEHICLE WHEEL WITH RUN-FLAT SUPPORT

[75] Inventors: Klaus Gerloff, Isernhagen; Dieter Ehlert, Gehrden; Klaus von der Wall, Wölpinghausen, all of Fed. Rep. of Germany

[73] Assignee: Continental Gummi-Werke Aktiengesellschaft, Hanover, Fed. Rep. of Germany

[21] Appl. No.: 818,536

[22] Filed: Jan. 10, 1986

[30] Foreign Application Priority Data

Jan. 15, 1985 [DE] Fed. Rep. of Germany ....... 3501116

[51] Int. Cl.$^4$ .................. B60C 17/04; B60B 21/12
[52] U.S. Cl. .......................... 152/380; 152/DIG. 20
[58] Field of Search ....... 152/516, 520, 521, DIG. 20, 152/158, 380

[56] References Cited

U.S. PATENT DOCUMENTS

| | | | |
|---|---|---|---|
| 2,040,645 | 5/1936 | Dickinson | 152/521 X |
| 4,173,243 | 11/1979 | Wilde et al. | 152/520 X |
| 4,258,767 | 3/1981 | Wilde | 152/520 X |
| 4,327,791 | 5/1982 | Strader | 152/158 |

FOREIGN PATENT DOCUMENTS 58-185305 10/1983 Japan .................. 152/520

*Primary Examiner*—David A. Scherbel
*Attorney, Agent, or Firm*—Becker & Becker, Inc.

[57] ABSTRACT

A vehicle wheel on which can be mounted a pneumatic tire, with the wheel being suitable for use during emergency operation of the tire. The tire is essentially made of rubber or rubber-like synthetic material, and has a carcass which is anchored in beads of the tire by being looped around bead cores. The inside of the tire is provided with an air-impermeable layer. The tire can also be reinforced with a belt. The wheel is provided with a rigid rim, including a rim ring, and with an emergency-operation element upon which the inner surface of the tire is supported during emergency operation of the latter. The emergency-operation element can be formed by the rim ring itself, or by a separate support element secured to the rim. In order to guarantee that emergency operation can be undertaken over a longer period of time without damaging the inner surface of the tire, at least one friction strip is disposed on the radially outer side of the emergency-operation element. This friction strip extends further radially outwardly than do any parts of the rim and emergency-operation element, so that during emergency operation of the tire, the latter is supported by the friction strip. Each friction strip is rotatably supported on the emergency-operation element.

15 Claims, 12 Drawing Figures

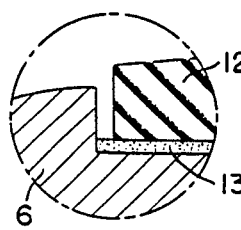
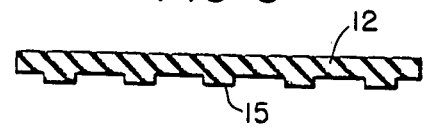
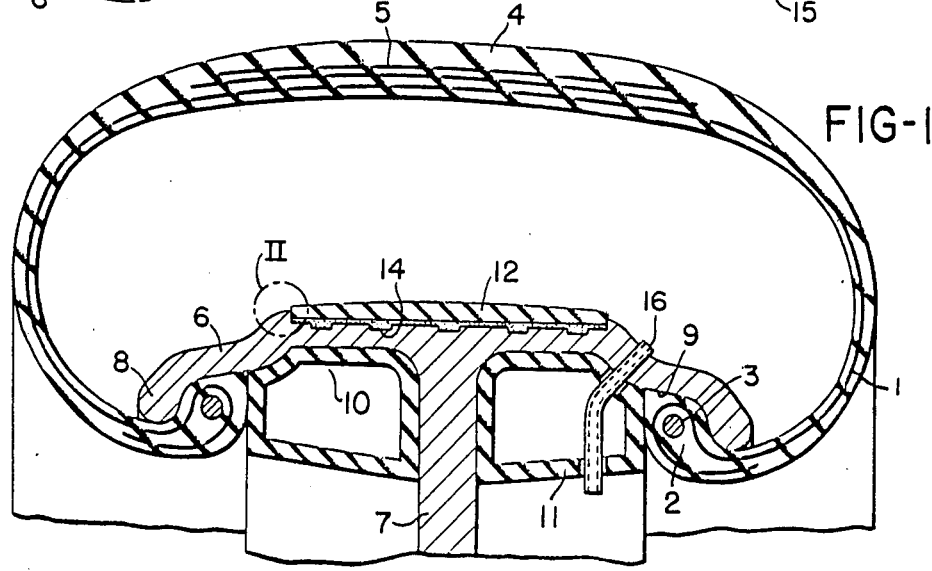
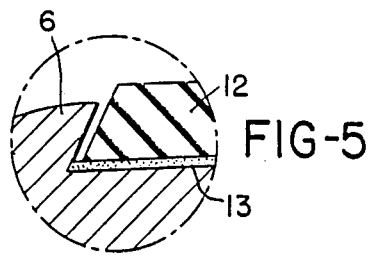
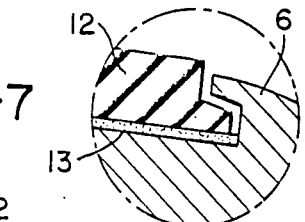
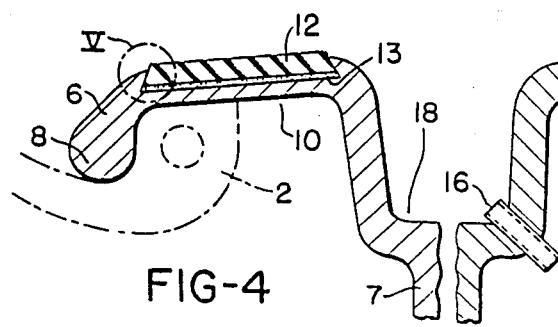
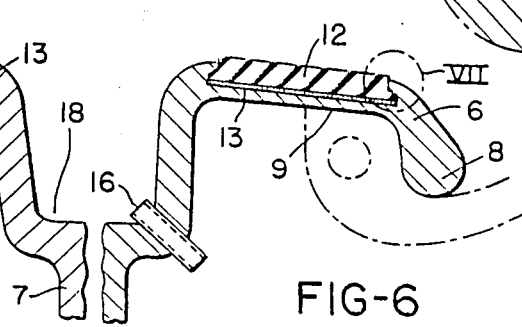

VEHICLE WHEEL WITH RUN-FLAT SUPPORT

BACKGROUND OF THE INVENTION

1. Field of the Invention

The present invention relates to a vehicle wheel on which can be mounted a pneumatic tire, with the wheel being suitable for use during emergency operation of the tire. The tire is essentially comprised of rubber or rubber-like sythetic material, and has a carcass which is anchored in beads of the tire by being looped around bead cores. The inside of the tire is provided with an air-impermeably layer. The tire can also be reinforced with a belt. The wheel is provided with a rigid rim, including a rim ring, and with an emergency-operation element upon which the inner surface of the tire is supported during emergency operation of the tire. The emergency-operation element can be formed by the rim ring itself, by a separate support element secured to the rim.

2. Description of the Prior Art

A vehicle wheel of this general type is disclosed in German Offenlegungsschrift 32 46 086 Frerichs et al dated June 14, 1984, belonging to the assignee of the present invention. This known vehicle wheel has a lubricant-like lining that is disposed on a supporting surface of the rim ring. This lining serves to support the inner surface of the tire during an emergency operation, and is intended to do so without too much heat being generated. However, it has been shown that when a damaged tire is driven for an extended period of time, too much heat is produced anyway; this heat frequently results in premature damage or destruction of the inner wall of the tire. This is due, at least in part, to the fact the the lubricant-like means is pushed to the side during an emergency operation.

Vehicle wheels have also been proposed for emergency operation where a support element is rotatably disposed on the rim. Since these heretofore known support elements have to assume the entire load during an emergency operation, they are very heavy and cumbersome, so that frequently insurmountable weight and mounting problems result. In addition, very complicated means are required in order to mount these heavy support elements on the rim in a rotatable manner.

An object of the present invention therefore is to provide a vehicle wheel that is suitable for emergency operation where the inner surface of the tire can withstand a longer period of emergency operation without undergoing damage, and where it is not necessary to rotatably mount a heavy support element on the rim.

BRIEF DESCRIPTION OF THE DRAWINGS

This object, and other objects and advantages of the present invention, will appear more clearly from the following specification in conjunction with the accompanying schematic drawings, in which:

FIG. 1 is a view showing a partial radial section through one inventive embodiment of a vehicle wheel having a one-piece rim and a single friction strip on the rim ring;

FIG. 2 is an enlarged view of the cross-sectional region indicated by the dot-dash circle II in FIG. 1;

FIG. 3 is a view showing a partial radial section of one inventive embodiment of a friction strip having guide fins;

FIG. 4 is a view showing a partial radial section of another inventive embodiment of a vehicle wheel having a drop-center rim and a respective friction strip in each of the shoulder regions of the rim;

FIG. 5 is an enlarged view of the cross-sectional region indicated by the dot-dash circle V in FIG. 4;

FIG. 6 is a view showing a partial radial section of a further inventive embodiment of a vehicle wheel having a drop-center rim and respective friction strips;

FIG. 7 is an enlarged view of the cross-sectional region indicated by the dot-dash circle VII in FIG. 6;

SUMMARY OF THE INVENTION

Figure 8:
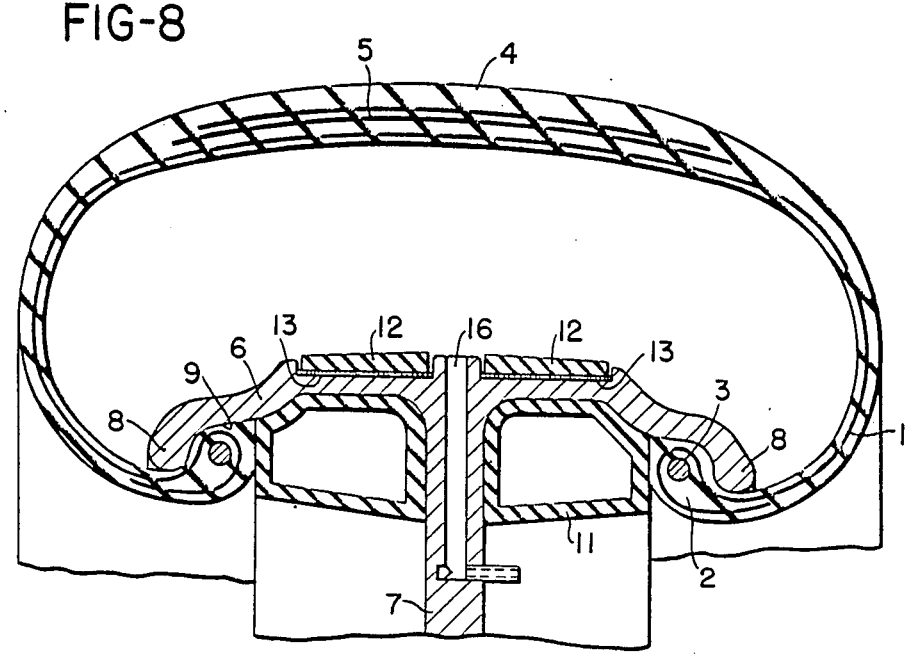
FIG. 8 is a view showing a partial radial section of another inventive embodiment of a vehicle wheel having a one-piece deep or recessed bed rim and two friction strips.

The vehicle wheel of the present invention is characterized primarily by having at least one friction strip disposed on the radially outer side of the emergency-operation element. This friction strip extends further radially outwardly than do any parts of the rim and emergency-operation element, so that during emergency operation of the tire, the latter is supported by the friction strip or strips. Furthermore, each friction strip is rotatably supported on the emergency-operation element.

The present invention offers the great advantage that during emergency operation, no relative movement occurs between the inner surface of the tire and the rim support on which the tire is supported. This is true because the friction strip, which serves as the support for the tire, is completely taken along by the latter due to the great amount of friction that is present between the friction strip and the inner surface of the tire. Relative movement now takes place only between the friction strip and the rim, or the support element of the rim, where only a minimal amount of heat is produced due to the possible presence of lubricant or slide means, and where furthermore the heat is best conveyed away via the metal of the rim.

The present invention also offers the advantage that the friction strip can be very thin, since it does not have to have a great amount of inherent rigidity, since the load is assumed by the stable rim that is disposed below the friction strip. Furthermore, in contrast to a bulky support element, the thin, inventive friction strip is very easy to mount.

Further advantageous features of the present invention will be described subsequently.

DESCRIPTION OF PREFERRED EMBODIMENTS

Referring now to the drawings in detail, the pneumatic vehicle tire used with the wheel and rim of FIG.

1 essentially comprises rubber or rubber-like material. Furthermore, the tire has a radial carcass 1 that is anchored in the beads 2 by being looped around pull-resistant and compression-resistant bead cores 3. Disposed below the tread 4, and between the latter and the carcass 1, is a belt 5 that is pull-resistant in the circumferential direction, and comprises two or more cord fabric plies; the belt 5 effects stabilization of the sides of the tire body.

The preferably metallic wheel rim essentially comprises a rim ring 6 that is secured in a known manner to a well 7. The rim ring 6 serves for supporting the tire beads 2 and also for supporting the tire during an emergency operation, i.e. in the event of a blow out or other damage to the tire that leads to a loss of pressure. When viewed in cross-section, the rim ring 6 of the predominantly one-piece rim provided on the outside, on each side, with a rim flange 8 that essentially extends radially inwardly. Disposed on the inner periphery of the rim ring 6, next to, and in the axial direction radially inwardly of, each rim flange 8 is a seating surface 9 for the tire. Axially inwardly of these seating surfaces 9 are respective so-called deep or recessed beds 10 that serve for mounting of the tire and can be filled with a filler ring 11 of rubber or some other suitable material.

On the radially outer side, an extremely broad central region of the rim ring 6 is provided with a nearly cylindrical surface that extends linearly or has a slight arch when viewed in the transverse direction. This region of the rim ring 6 serves as a support element for the tire during emergency operation.

In the embodiment illustrated in FIG. 1, a relatively thin, arched friction strip 12 is mounted in this central region of the rim ring 6; the sides of the friction strip 12 are guided by small raised portions of the rim ring 6. The friction strip 12 can be made of rubber; to increase the strength of the strip, it is expedient to embed therein reinforcing members that are preferably disposed in the circumferential direction. However, if necessary, the friction strip 12 can also be made of a suitable synthetic material or of metal. So that during an emergency operation the friction strip 12 can easily rotate or turn on the rim ring 6, a lubricant or slide means 13 (FIG. 2) is disposed between the friction strip 12 and the rim ring 6. Grooves 14 that predominantly extend in the circumferential direction, and that can have a zigzag or wave shape, serve to better hold the slide means 13, which can, for example, be in the form of a ring of TEFLON (tetrafluoroethylene), graphite, a mixture of silicon and either carbon black or graphite, or any suitable lubricant-like material.

The enlarged cross-sectional view of FIG. 2 clearly shows that the main thing is that the friction strip 12 extends beyond the side parts of the rim ring 6 in the radial direction, so that during an emergency operation the inner wall of the tire is supported upon the friction strip 12 and not upon the side parts of the rim ring 6. It is sufficient if the friction strip 12 extends 1 to 3 mm radially beyond the rim ring 6, with the central portion of the friction strip 12 having a thickness of 2 to 8 mm.

FIG. 3 shows a further embodiment of a friction strip 12; this friction strip is characterized by guide fins 15 that can extend into circumferential grooves 14.

FIG. 4 shows a portion of vehicle wheel having a drop-center rim that in many cases is preferred for better mounting of the tire. The tire beads 2 are again disposed on the radially inner periphery of the rim next to rim flanges 8 that extend radially inwardly. A recessed bed 10 is used for mounting the tire. Disposed radially outwardly in the shoulder region of the rim ring 6, next to the drop-center 18, are respective friction strips 12. These friction strips 12, in conjunction with the rim rings 6, again serve as support means during an emergency operation. To avoid friction between the rim ring 6 and the friction strip 12 during rotation of the latter, a suitable lubricant or slide means 13 is again provided.

FIG. 5 is an enlarged cross-sectional view of the encircled region V in FIG. 4. From here it can be seen that the sides of the friction strip 12 extend into undercut areas of the rim ring 6.

The vehicle wheel illustrated in FIG. 6 differs from that of FIG. 4 merely in how lateral guidance of the friction strip 12 is provided; this can be seen clearly from FIG. 7. In this embodiment, the side edges of the friction strip 12 do not extend straight; rather, they are curved or stepped.

FIG. 8 also shows a vehicle wheel having a one-piece rim where the tire beads are disposed on the radially inner periphery of the rim ring 6, and a recessed bed 10 in the shoulder region of the rim ring serves for mounting of the tire. However, in contrast to the embodiment of the wheel shown in FIG. 1, two axially spaced-apart friction strips 12 are disposed on the radially outer side of the rim ring 6. The space between the friction strips 12 can be used to feed a valve. In other respects, the same features exist as were already described in connection with the embodiment of FIG. 1.

Figure 9:
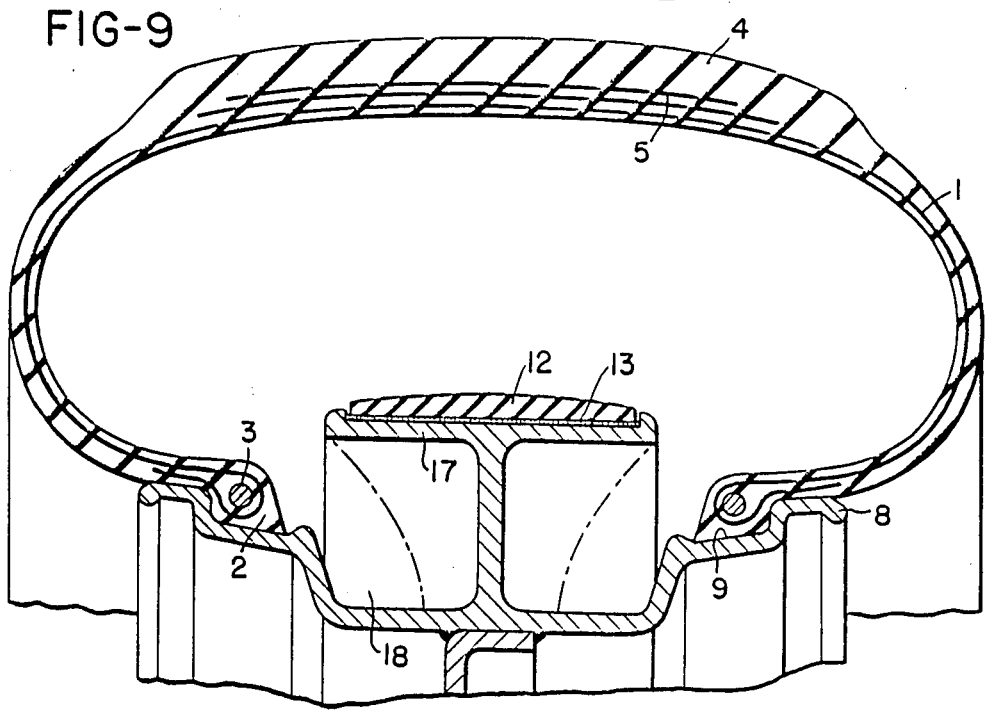
FIG. 9 is a view showing in radial section showing yet another inventive embodiment of a vehicle wheel having a support element on the rim and a single friction strip.

The embodiment illustrated in FIG. 9 primarily differs from the previously described embodiments in that the beads of the tire are disposed on the radially outer periphery of a rim, and in that the emergency-operation element is not formed by the rim ring, but rather is formed by a support element 17. Two small drop-centers 18 are used for mounting the tire in the event that the support element 17 is already mounted on the rim ring or is even welded thereon. Disposed radially outwardly on the support element 17 is a friction strip 12 that is rotatable on the support element 17 via the use of a lubricant or slide means 13; this friction strip 12 also is secured from shifting to the side. With this embodiment, during an emergency operation the load is not assumed by the rim ring, but is rather assumed by the support element 17. However, also with this embodiment no relative movement occurs between the inner side or core of the tire and the friction strip 12 during emergency operation, so that heat is generated only between the friction strip 12 and the support element 17; if the support element is metallic, the heat can be conveyed to the rim.

Figure 10:
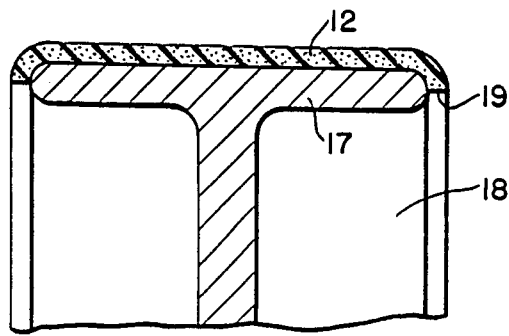
FIG. 10 is a view showing a partial radial section of a support element similar to that shown in FIG. 9, with the friction strip being in the form of a PTFE sleeve.

It is also possible to use a support element 17 of the type illustrated in FIG. 10 for the vehicle wheel of FIG. 9. Such a support element 17 carries a friction strip 12 in the form of a sliding sleeve that is provided with guide elements 19 that partially embrace the sides of the support element 17. This friction strip is preferably made of polytetrafluoroethylene, but can also be made of any other suitable material. If PTFE is used, it is not necessary to have a separate lubricant or slide means.

Figure 11:
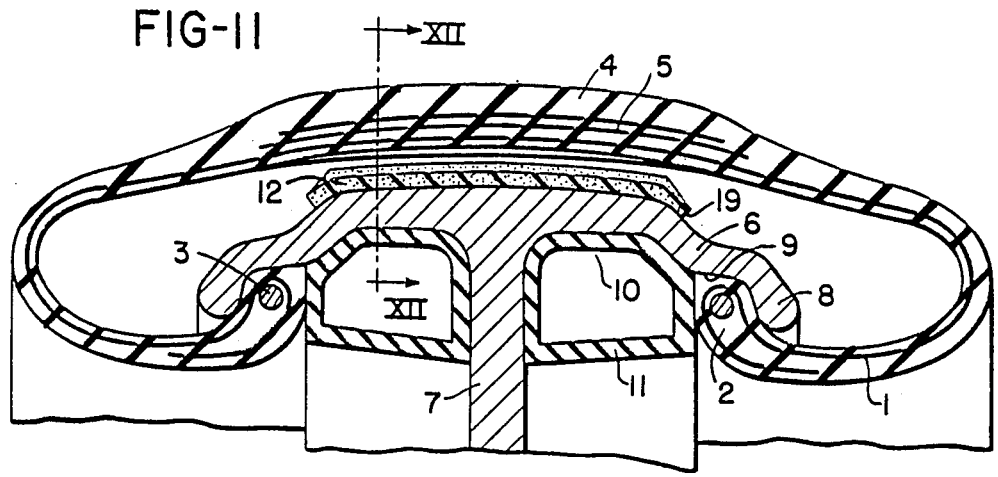
FIG. 11 is a view showing a partial radial section through an inventive embodiment of a vehicle wheel in the emergency operation position, with the wheel having a one-piece rim that is provided with a friction strip in the form of a PTFE sleeve on the rim ring.

FIG. 11 shows a vehicle wheel in an emergency operation position. The wheel is essentially constructed like the embodiment of FIG. 1. The significant difference is that the friction strip 12 is embodied as a sliding sleeve that, rather than being partially disposed in the rim ring 6, is placed thereupon, with its radially outer parts extending radially inwardly to better guide the sides of the strip; in this way, the edges of the friction strip 12, which is preferably made of PTFE, form lateral guide elements 19.

Figure 12:
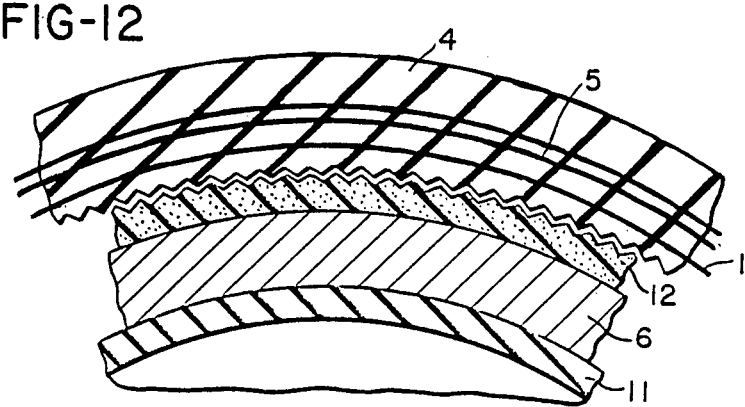
FIG. 12 is a cross-sectional view taken along the line XII—XII in FIG. 11.

So that during an emergency operation slippage is reliably prevented between the tire and the friction strip 12, a fine profiling can be provided on the inner surface of the tire and/or on the friction strip 12, as shown in FIG. 12. It is to be understood that such a profiling could also be provided for any of the illustrated embodiments. Furthermore, it is also within the scope of the present invention to interchange various features of the illustrated embodiments.

The present invention is, of course, in no way restricted to the specific disclosure of the specification and drawings, but also encompasses any modifications within the scope of the appended claims.

What we claim is:

1. A vehicle wheel on which can be mounted a pneumatic tire having a tread as well as a belt below said tread, with the wheel being suitable for use during emergency operation of the tire; the tire is essentially comprised of rubber or rubber-like synthetic material, and has a carcass that is anchored in beads of the tire by being looped around bead cores; the inside of the tire is provided with an air-impermeable layer; the wheel is provided with a rigid rim that includes an emergency-operation element upon which the inner surface of the tire is supported during emergency operation of the tire; said wheel further comprises:

at least one friction strip disposed on the radially outer side of said emergency-operation element; said friction strip extending further radially outwardly than do any parts of said rim and emergency-operation element, so that during emergency operation of said tire, the latter is supported by said friction strip; said friction strip being rotatably supported on said emergency-operation element; and lateral guide elements integral with said friction strip and extending in circumferential direction of said rim as well as extending over sides of said emergency-operation element in a direction angularly inwardly and away from said tread and said belt.

2. A vehicle wheel on which can be mounted a pneumatic tire, with the wheel being suitable for use during emergency operation of the tire; the tire is essentially comprised of rubber or rubber-like synthetic material, and has a carcass that is anchored in beads of the tire by being looped around bead cores; the inside of the tire is provided with an air-impermeable layer; the wheel is provided with a rigid rim that includes an emergency-operation element upon which the inner surface of the tire is supported during emergency operation of the tire; said wheel further comprises:

at least one friction strip disposed on the radially outer side of said emergency-operation element; said friction strip extending further radially outwardly than do any parts of said rim and emergency-operation element, so that during emergency operation of said tire, the latter is supported by said friction strip; said friction strip being rotatably supported on said emergency-operation element; said emergency-operation element being provided with grooves that extend in the circumferential direction of said rim; said friction strip being provided with guide fins that extend into said grooves.

3. A vehicle wheel according to claim 2, in which said rim includes a rim ring, with said emergency-operation element being formed by a portion of said rim ring.

4. A vehicle wheel according to claim 3, in which said rim is a one-piece rim, with said tire beads being disposed on the radially inner periphery of said rim ring.

5. A vehicle wheel according to claim 4, which includes two friction strips disposed on the radially outer side of said rim ring.

6. A vehicle wheel according to claim 5, in which said rim includes a drop-center that is disposed between said two friction strips.

7. A vehicle wheel according to claim 5, in which each of said friction strips is in the form of a sliding sleeve having lateral guide elements that extend in the circumferential direction of said rim and partially extend over sides of said emergency-operation element.

8. A vehicle wheel according to claim 7, in which each of said friction strips is made of polytetrafluoroethylene.

9. A vehicle wheel according to claim 2, in which said emergency-operation element is a separate support element secured to said rim.

10. A vehicle wheel according to claim 9, in which said rim is a one-piece rim; in which said support element and said tire beads are disposed on the radially outer periphery of said rim; in which said support element has a portion which extends in the circumferential direction of said rim; and in which said rim includes a respective drop-center disposed on each side of said circumferentially extending portion of said support element.

11. A vehicle wheel according to claim 2, which includes lubricant-like slide means disposed between said friction strip and said emergency-operation element.

12. A vehicle wheel according to claim 2, in which said emergency-operation element is provided with guide means that extend in the circumferential direction of said rim for guiding sides of said friction strip.

13. A vehicle wheel according to claim 12, in which said guide means are formed by undercut regions of said emergency-operation element, with side portions of said friction strip extending into said undercut regions.

14. A vehicle wheel according to claim 2, in which said friction strip has a thickness of 2 to 8 mm extending radially outwardly beyond any part of said rim and emergency-operation element by 1 to 3 mm.

15. A vehicle wheel according to claim 2, in which said friction strip is made of a material selected from the group consisting of synthetic material, metal, and rubber in which are embedded load-carrying means.

* * * * *